UNITED STATES PATENT OFFICE.

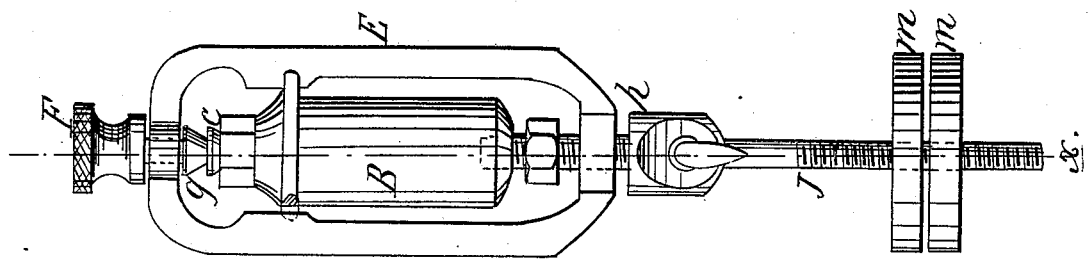
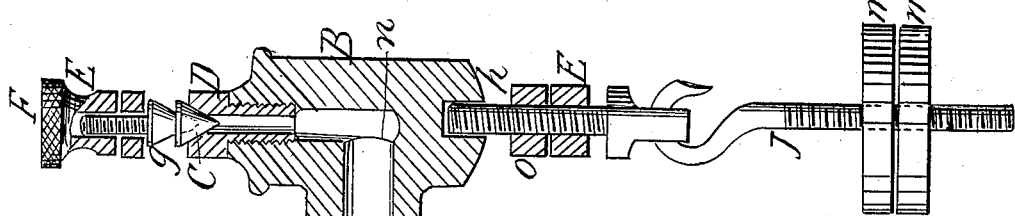
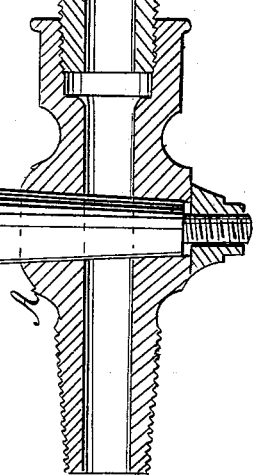

F. T. RIEGEL, OF PHILADELPHIA, PENNSYLVANIA.

IMPROVEMENT IN PRESSURE-INDICATORS.

Specification forming part of Letters Patent No. 81,006, dated August 11, 1868.

*To all whom it may concern:*

Be it known that I, F. T. RIEGEL, of Philadelphia, in the county of Philadelphia and State of Pennsylvania, have invented a new and Improved Steam-Indicator; and I do hereby declare that the following is a full, clear, and exact description thereof, which will enable those skilled in the art to make and use the same, reference being had to the accompanying drawings, forming part of this specification.

This invention relates to a device for indicating the pressure in steam-boilers; and it consists in arranging a steam-chamber in communication with the boiler, and providing the same with a valve, which is held to its seat by a yoke and weight, in the manner hereinafter described.

The drawing, Figure 1, represents a sectional side view of the indicator, the section being through the line $x\ x$ of Fig. 2. Fig. 2 is a front view of the indicator as when in use.

Similar letters of reference indicate corresponding parts.

A is a steam-cock, which screws into the boiler. B is the chamber, which screws into the outer end of the steam-cock A. C is a conical valve, which is fitted to a conical seat in the upper portion of the chamber B. The upper part of the chamber B is formed by a tube, D, which is screwed into the body of the chamber, as seen in the drawing. The valve-seat is in this tube. E is a yoke, through the top of which there is a screw, F, which enters a cone, $g$. This cone $g$ fits into the top of the valve C, and the valve is adjusted in its seat by the screw. At the lower end of the yoke, and passing up through it, there is a screw, $h$. The upper end of this screw enters the lower end of the chamber B, and acts as a guide for the yoke, to keep it in place.

To the lower end of the screw $h$ there is a screw-hook attached, (marked J,) and to the screw-hook J there are one or more weights attached, by screw-threads, as seen in the drawing. These weights are marked $m$. The peripheries of these weights are corrugated or serrated, so as to admit of their being readily attached and screwed onto the hook J. The chamber B is so bored that the holes intersect at right angles, as seen at $n$, thus forming a direct channel or communication with the boiler when the cock A is open, thereby allowing the steam to press upon the valve C. $o$ is a nut on the screw $h$.

When the steam-pressure is sufficient to overcome the weight of the yoke, and the weights $m\ m$ suspended on it from the point of the screw F, steam will be discharged through the valve.

It will be seen that any given amount of pressure may be carried by increasing or diminishing the weight on the hook J.

This indicator has no levers, and the pressure being resisted by a dead weight can be easily regulated.

By this arrangement the valve may be so nicely adjusted that any increase in the pressure will be at once indicated.

I claim as new and desire to secure by Letters Patent—

1. The chamber B, the valve-seat tube D, the conical valve C, cone $g$, and screw F, constructed and arranged substantially as described, for the purpose set forth.

2. The yoke E, the screw $h$, and the weighted screw-hook J, in combination with the chamber and valve, as above mentioned, substantially as and for the purposes described.

F. T. RIEGEL.

Witnesses:
SAML. P. JONES, Jr.,
J. R. STUARD.